United States Patent
Takata et al.

(10) Patent No.: US 12,240,025 B2
(45) Date of Patent: *Mar. 4, 2025

(54) SHEET TRANSITIONING IN SPIRAL FORMED STRUCTURES

(71) Applicant: KEYSTONE TOWER SYSTEMS, INC., Denver, CO (US)

(72) Inventors: Rosalind K. Takata, Denver, CO (US); Loren Daniel Bridgers, Golden, CO (US); Eric D. Smith, Denver, CO (US)

(73) Assignee: KEYSTONE TOWER SYSTEMS, INC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,368

(22) Filed: Dec. 19, 2022

(65) Prior Publication Data

US 2023/0201901 A1 Jun. 29, 2023

Related U.S. Application Data

(63) Continuation of application No. 17/038,059, filed on Sep. 30, 2020, now Pat. No. 11,529,661, which is a
(Continued)

(51) Int. Cl.
*B21C 37/18* (2006.01)
*B23K 31/02* (2006.01)
*E04H 12/08* (2006.01)

(52) U.S. Cl.
CPC .......... *B21C 37/185* (2013.01); *B23K 31/027* (2013.01); *E04H 12/08* (2013.01); *Y02E 10/728* (2013.01)

(58) Field of Classification Search
None
See application file for complete search history.

(56) References Cited

U.S. PATENT DOCUMENTS 3,775,835 A * 12/1973 Cauffiel ................ B21C 37/185
138/156
3,797,088 A * 3/1974 Stettler .................. B21D 53/30
413/1
(Continued)

FOREIGN PATENT DOCUMENTS

CN 102176986 A 9/2011
CN 102883848 1/2013
(Continued)

OTHER PUBLICATIONS

CNIPA, CN Application Serial No. 201780053473.X, Office Action mailed Apr. 1, 2020, English and Chinese Translations, 32 pages.
(Continued)

*Primary Examiner* — Joshua K Ihezie
(74) *Attorney, Agent, or Firm* — The Marbury Law Group, PLLC

(57) ABSTRACT

Spiral forming devices, systems, and methods can be used to join edges of a of a stock material, in a curved configuration, along one or more joints to form tubular structures, such as conical and/or cylindrical structures (e.g., frusto-conical structures). A planar form of the stock material can be formed from a plurality planar sheets coupled to one another in an abutting relationship. By controlling relative orientation and shapes of the plurality of planar sheets forming the stock material and/or by controlling a position of a roll bender used to curve the planar form of the stock material into the curved configuration, the curved configuration of the stock material can be controlled through transitions between sheets to facilitate rolling the sheets to a desired diameter with a reduced likelihood of dimples or other errors and to facilitate fit up between adjacent sheets in the curved configuration.

7 Claims, 11 Drawing Sheets

Related U.S. Application Data continuation of application No. 16/692,523, filed on Nov. 22, 2019, now Pat. No. 10,807,136, which is a continuation of application No. 16/183,231, filed on Nov. 7, 2018, now Pat. No. 10,486,212, which is a continuation of application No. 15/692,461, filed on Aug. 31, 2017, now Pat. No. 10,201,841.

(60) Provisional application No. 62/381,749, filed on Aug. 31, 2016.

(56) References Cited

U.S. PATENT DOCUMENTS

| | | | | | |
|---|---|---|---|---|---|
| 3,888,283 | A | * | 6/1975 | Cauffiel | B21C 37/124 |
| | | | | | 228/145 |
| 4,945,363 | A | * | 7/1990 | Hoffman | H01Q 11/083 |
| | | | | | 343/895 |
| 8,636,196 | B2 | * | 1/2014 | Hill | B21C 37/15 |
| | | | | | 228/145 |
| 8,720,153 | B2 | * | 5/2014 | Smith | E04H 12/08 |
| | | | | | 52/843 |
| 9,475,153 | B2 | * | 10/2016 | Smith | B21C 37/185 |
| 10,201,841 | B2 | * | 2/2019 | Takata | B23K 31/027 |
| 10,486,212 | B2 | * | 11/2019 | Takata | B21C 37/185 |
| 10,807,136 | B2 | * | 10/2020 | Takata | E04H 12/08 |
| 2002/0139160 | A1 | | 10/2002 | Price et al. | |
| 2005/0013954 | A1 | * | 1/2005 | Kaegi | B21C 37/065 |
| | | | | | 228/173.6 |
| 2007/0176416 | A1 | * | 8/2007 | Swank | F16L 33/04 |
| | | | | | 285/226 |
| 2007/0176419 | A1 | | 8/2007 | Taillon | |
| 2010/0095508 | A1 | * | 4/2010 | Wahlen | F03D 13/20 |
| | | | | | 219/162 |
| 2011/0179623 | A1 | | 7/2011 | Smith et al. | |
| 2011/0206943 | A1 | | 8/2011 | Willis et al. | |
| 2013/0074564 | A1 | * | 3/2013 | Smith | B21B 39/02 |
| | | | | | 72/133 |
| 2015/0273550 | A1 | * | 10/2015 | Takata | B21C 37/185 |
| | | | | | 72/12.5 |
| 2016/0375476 | A1 | * | 12/2016 | Smith | B21C 37/128 |
| | | | | | 72/8.9 |
| 2018/0056354 | A1 | | 3/2018 | Takata et al. | |
| 2019/0151920 | A1 | | 5/2019 | Takata et al. | |

FOREIGN PATENT DOCUMENTS

| | | |
|---|---|---|
| CN | 104114319 | 10/2014 |
| CN | 203880246 | 10/2014 |
| DE | 69600580 | 10/1998 |
| EP | 3928884 A1 | 12/2021 |
| GB | 308419 A | 3/1929 |
| JP | H0647433 A | 2/1994 |
| WO | 2011106074 | 9/2011 |
| WO | 2013043920 | 3/2013 |
| WO | 2018045168 | 3/2018 |

OTHER PUBLICATIONS

EPO, EP Application No. 17847545.5, Extended Search Report mailed Mar. 20, 2020, 8 pages.

European Patent Office, "Extended European Search Report," issued in related European Patent Application No. 21189601.4-1016, dated Dec. 1, 2021 (9 pages).

National Intellectual Property Administration, P. R. China, "Third Office Action," issued in related Chinese Patent Application No. 201780053473.X and English-language Translation, dated May 20, 2021 (10 pages).

Australian Government, IP Australia, "Examination Report No. 1 for Standard Patent Application," issued in related Australian Patent Application No. 2017321698, dated Jan. 6, 2022 (3 pages).

The U.S. Patent and Trademark Office, "International Search Report and Written Opinion," issued in related International Patent Application No. PCT/US2017/49612, dated Nov. 8, 2017 (11 pages).

European Patent Office, "Decision to Grant," in related European Patent Application No. 17847545.5, dated Sep. 9, 2021 (2 pages).

European Patent Office, "Examination Report," issued in related European Patent Application No. 21189601.4, dated Nov. 23, 2022 (6 pages).

National Intellectual Property Administration, P.R. China, "Second Office Action and Search Report," issued in related Chinese Patent Application No. 201780053473.X, dated Dec. 2, 2020, including English-language Translation (10 pages).

National Intellectual Property Administration, P.R. China, "Notification to Grant Patent," issued in related Chinese Patent Application No. 201780053473.X, dated Sep. 3, 2021, including English-language Translation (4 pages).

National Intellectual Property Administration, P.R. China, "First Office Action," issued in related Chinese Patent Application No. 202110896847.2, dated Jul. 11, 2023, including English-language Translation (10 pages).

Canadian Intellectual Property Office, "Examiner's Report," issued in related Canadian Patent Application No. 3,033,227, dated May 11, 2023 (4 pages).

Mexican Institute of Industrial Property, "1st Substantive Examination," issued in related Mexican Patent Application No. MX/a/2019/002189, dated Sep. 19, 2022, including English-language Translation (6 pages).

Mexican Institute of Industrial Property, "Grant Proceeds," issued in related Mexican Patent Application No. MX/a/2019/002189, dated Mar. 6, 2023 (2 pages).

The United States Patent and Trademark Office, "Non-Final Office Action," issued in related U.S. Appl. No. 15/692,461, dated Mar. 9, 2018 (14 pages).

The United States Patent and Trademark Office, "Notice of Allowance and Issue Fee(s) Due," issued in related U.S. Appl. No. 15/692,461, dated Sep. 18, 2018 (9 pages).

The United States Patent and Trademark Office, "Non-Final Office Action," issued in related U.S. Appl. No. 16/183,231, dated Jun. 13, 2019 (13 Pages).

The United States Patent and Trademark Office, "Notice of Allowance and Issue Fee(s) Due," issued in U.S. Appl. No. 16/183,231, dated Jul. 25, 2019 (5 Pages).

The United States Patent and Trademark Office, "Non-Final Office Action," issued in related U.S. Appl. No. 16/692,523, dated Apr. 1, 2020 (14 pages).

The United States Patent and Trademark Office, "Notice of Allowance and Issue Fee(s) Due," issued in related U.S. Appl. No. 16/692,523, dated Jun. 26, 2020 (12 pages).

The United States Patent and Trademark Office, "Non-Final Office Action," issued in related U.S. Appl. No. 17/038,059, dated Aug. 19, 2021 (13 pages).

The United States Patent and Trademark Office, "Non-Final Office Action," issued in related U.S. Appl. No. 17/038,059, dated Jan. 3, 2022 (6 pages).

The United States Patent and Trademark Office, "Notice of Allowance and Fee(s) Due," issued in related U.S. Appl. No. 17/038,059, dated Apr. 27, 2022 (7 pages).

The United States Patent and Trademark Office, "Notice of Allowance and Fee(s) Due," issued in related U.S. Appl. No. 17/038,059, dated Aug. 24, 2022 (11 pages).

The U.S. Patent and Trademark Office, "International Preliminary Report on Patentability," issued in related International Patent Application No. PCT/US2017/49612, dated Mar. 5, 2019 (9 pages).

National Intellectual Property Administration, P.R. China, "Notification to Grant Patent," issued in related Chinese Patent Application No. 202110896847.2, dated Mar. 6, 2024, including English-language Translation (4 pages).

European Patent Office, "Decision to Grant," issued in related European Patent Application No. 21189601.4, dated Mar. 21, 2024 (2 pages).

(56) References Cited

OTHER PUBLICATIONS

IP Australia, "Examination Report No. 1," issued in related Australian Patent Application No. 2023201141, dated Apr. 23, 2024 (5 pages).

* cited by examiner

SHEET TRANSITIONING IN SPIRAL FORMED STRUCTURES

CROSS-REFERENCE TO RELATED APPLICATIONS

This application is a continuation of U.S. patent application Ser. No. 17/038,059, filed on Sep. 30, 2020, which is continuation of U.S. patent application Ser. No. 16/692,523 (now U.S. Pat. No. 10,807,136), filed on Nov. 22, 2019, which is a continuation of U.S. patent application Ser. No. 16/183,231 (now U.S. Pat. No. 10,486,212), filed on Nov. 7, 2018, which is a continuation of U.S. patent application Ser. No. 15/692,461 (now U.S. Pat. No. 10,201,841), filed on Aug. 31, 2017, which claims the benefit of priority of U.S. Provisional Patent Application No. 62/381,749, filed on Aug. 31, 2016, with the entire contents of each of these applications hereby incorporated herein by reference.

GOVERNMENT LICENSE RIGHTS

This invention was made with government support under NSF Phase II SBIR grant NSF IIP-1353507, awarded by the National Science Foundation. The United States government has certain rights in this invention.

BACKGROUND

In a spiral forming manufacturing process, a sheet of steel is fed into a mill and continuously roll-formed into a desired shape. For example, using this technique a cylinder or a conical shape can be formed by feeding sheets of suitably shaped material into the mill and continuously joining the curved, roll-formed material along a spiral edge as the material exits the mill. While a variety of useful structures such as steel towers for wind turbines can be fabricated using this technique, transitions between the sheets used to form these structures present certain challenges with respect to meeting manufacturing tolerances and efficient use of material in the final structures.

SUMMARY

Spiral forming devices, systems, and methods can be used to join edges of a stock material, in a curved configuration, along one or more joints to form tubular structures, such as conical and/or cylindrical structures (e.g., frusto-conical structures). A planar form of the stock material can be formed from a plurality planar sheets coupled to one another in an abutting relationship. By controlling relative orientation and shapes of the plurality of planar sheets forming the stock material and/or by controlling a position of a roll bender used to curve the planar form of the stock material into the curved configuration, the curved configuration of the stock material can be controlled through transitions between sheets to facilitate rolling the sheets to a desired diameter with a reduced likelihood of dimples or other errors and to facilitate fit up between adjacent sheets in the curved configuration to increase the likelihood of meeting manufacturing tolerances in the final structure.

According to one aspect, a collection of a plurality of planar sheets can be collectively dimensioned to form, in a curved configuration, a tubular structure, and the plurality of planar sheets can include a first planar sheet having a pair of first longitudinal edges, a mating edge, and an alignment edge, the mating edge and the alignment edge together defining a nonlinear path extending between the first longitudinal edges, and a second planar sheet having a pair of second longitudinal edges and a lateral edge, the lateral edge extending between the second longitudinal edges, wherein the first planar sheet and the second planar sheet are dimensioned to be positionable relative to one another in an abutting relationship in which the mating edge of the of the first planar sheet complements the lateral edge between the second longitudinal edges of the second planar sheet and the alignment edge of the of the first planar sheet is collinear with one of the second longitudinal edges of the second planar sheet.

In certain implementations, in the abutting relationship between the first planar sheet and the second planar sheet, the first planar sheet and the second planar sheet can form a continuous surface.

In some implementations, in the abutting relationship between the first planar sheet and the second planar sheet, one of the first longitudinal edges of the first planar sheet can be oblique relative to one of the second longitudinal edges of the second planar sheet.

In certain implementations, in the abutting relationship between the first planar sheet and the second planar sheet, one of the first longitudinal edges of the first planar sheet can contact one of the second longitudinal edges of the second planar sheet to define a substantially continuous edge.

In some implementations, the first planar sheet can have a first thickness, and the second planar sheet have a second thickness equal to the first thickness.

In certain implementations, the first planar sheet and the second planar sheet can each have an elongate shape, and the first planar sheet and the second planar sheet can have different lengths.

In some implementations, the pair of first longitudinal edges can be parallel to one another. Additionally, or alternatively, the pair of second longitudinal edges can be parallel to one another. In certain instances, the pair of first longitudinal edges of the first planar sheet can define a first width, and the pair of second longitudinal edges of the second planar sheet can define a second width equal to the first width.

In certain implementations, the mating edge of the first planar sheet can include at least one linear segment.

In some implementations, the lateral edge of the second planar sheet can define a linear path between the pair of second longitudinal edges of the second planar sheet.

In certain implementations, the lateral edge of the second planar sheet can define a nonlinear path between the pair of second longitudinal edges of the second planar sheet. For example, the nonlinear path defined by the lateral edge can have one or more straight segments angled relative to one another. Additionally, or alternatively, the nonlinear path, along which the lateral edge of the second planar sheet extends, can define a chevron. Further, or instead, the nonlinear path, along which the lateral edge of the second planar sheet extends, includes a curvilinear shape.

In some implementations, the first planar sheet and the second planar sheet can each be formed of metal.

In certain implementations, the plurality of planar sheets can be collectively dimensioned to form, in a curved configuration, a frusto-conical structure without in-plane deformation of the planar sheets.

According to another aspect, a frusto-conical structure can include a first curved sheet having a pair of first longitudinal edges, a mating edge and an alignment edge, the mating edge and the alignment edge together defining a nonlinear path extending between the first longitudinal edges, and a second curved sheet having a pair of second longitudinal edges and a lateral edge, the lateral edge extending between the second longitudinal edges, the lateral edge of the second curved sheet and the mating edge of the first curved sheet coupled to one another to form a lateral seam extending from one of the second longitudinal edges to another one of the second longitudinal edges, the alignment edge of the first curved sheet forming at least a portion of a first spiral seam with one of the second longitudinal edges of the second curved sheet.

In some implementations, one of the first longitudinal edges of the first curved sheet and one of the second longitudinal edges of the second curved sheet can be joined along the first spiral seam. Additionally, or alternatively, the first curved sheet and the second curved sheet can be coupled to one another at an intersection of the lateral seam, the first spiral seam, and a second spiral seam, and the lateral seam, the first spiral seam and the second spiral seam can be oblique relative to one another at the intersection.

In certain implementations, the first curved sheet and the second curved sheet can each be formed of metal, and the lateral seam can include a weld coupling the first curved sheet and the second curved sheet to one another.

In some implementations, the first curved sheet and the second curved sheet can be coupled to one another without in-plane deformation.

According to still another aspect, a method can include obtaining a plurality of planar sheets comprising a first planar sheet having a pair of first longitudinal edges, a mating edge, and an alignment edge, the mating edge and the alignment edge defining a nonlinear path extending between the first longitudinal edges, and a second planar sheet having a lateral edge and a pair of second longitudinal edges, the lateral edge extending between the second longitudinal edges, positioning the first planar sheet and the second planar sheet relative to one another in an abutting relationship in which the mating edge the first planar sheet complements the lateral edge of the second planar sheet between the second longitudinal edges and the alignment edge of the first planar sheet is collinear with one of the second longitudinal edges of the second planar sheet, coupling the mating edge of the first planar sheet to the lateral edge of the second planar sheet along a lateral seam to form a stock material in planar form, curving the stock material into a curved configuration, and spiral welding the stock material to form a frusto-conical structure.

In certain implementations, the lateral seam includes at least one non-linear segment.

In some implementations, the lateral seam can include at least one linear segment.

In certain implementations, the first planar sheet and the second planar sheet can each be elongate, and the first planar sheet and the second planar sheet can each have different lengths.

In some implementations, spiral welding the stock material to form the frusto-conical structure includes coupling one of the first longitudinal edges of the first planar sheet, in a curved configuration, to one of the second longitudinal edges of the second planar sheet, in a curved configuration.

According to still another aspect, a method can include moving a first planar sheet and a second planar sheet in a feed direction through roll banks of a roll bender, the first planar sheet and the second planar sheet coupled to one another in an abutting relationship, a length of the abutting relationship between the first planar sheet and the second planar sheet along the feed direction defining a transition length, within the transition length, curving the first planar sheet and the second planar sheet with the roll banks of the roll bender set at a first position, the first planar sheet and the second planar sheet having different curvature responses to the roll banks of the roll bender set at the first position, and within the transition length, curving the first planar sheet and the second planar sheet with the roll banks of the roll bender set at a second position different from the first position, the first planar sheet and the second planar sheet having different curvature responses to the roll banks of the roll bender set at the second position.

In certain implementations, the first planar sheet has a thickness greater than a thickness of the second planar sheet, and the first planar sheet and the second planar sheet can be curved by the roll banks of the roll bender set to the second position when more than half of the transition length has moved past a center roll of the roll bender.

In some implementations, the first planar sheet can have a thickness less than a thickness of the second planar sheet, and the first planar sheet and the second planar sheet can be curved by the roll banks of the roll bender set to the second position when less than half of the transition length has moved past a center roll of the roll bender.

In certain implementations, curving the first planar sheet and the second planar sheet with the roll banks of the roll bender set at the second position includes moving one or more of the roll banks of the roll bender relative to one another from the first set position to the second set position.

In some implementations, the method can further include, along a length in the feed direction within the transition length, curving the second planar sheet with the roll banks of the roll bender set at a third set position different from the second set position. For example, a respective curvature response of the second planar sheet to the roll banks of the roll bender set to the third position is substantially equal to a respective curvature response of the first planar sheet to the roll banks of the roll bender set to the first position such that at least a portion of the first planar sheet and a portion of the second planar sheet are rolled at substantially the same diameter.

In certain implementations, the roll banks of the roll bender can be arranged as a triple roll.

In some implementations, a thickness of the first planar sheet can be different from a thickness of the second planar sheet.

In certain implementations, the thickness of the first planar sheet can be greater than the thickness of the second planar sheet.

In some implementations, the thickness of the first planar sheet can be less than the thickness of the second planar sheet.

In certain implementations, the abutting relationship between the first planar sheet and the second planar sheet includes abutment along one or more edges that are oblique to the feed direction as the first planar sheet and the second planar sheet moving through the roll bender along the transition length.

In some implementations, the abutting relationship between the first planar sheet and the second planar sheet can include a curvilinear shape.

In certain implementations, an in-feed angle of the first planar sheet and the second planar sheet along the transition length can be oblique to an axis defined by one of the roll banks of the roll bender.

In some implementations, the first planar sheet and the second planar sheet can have the same maximum width in a direction perpendicular to respective longitudinal edges of the first planar sheet and the second planar sheet.

Other aspects, features, and advantages will be apparent from the description and drawings, and from the claims.

BRIEF DESCRIPTION OF THE FIGURES

Like reference symbols in the various drawings indicate like elements.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially" or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," "below," "up," "down," and the like, are words of convenience and are not to be construed as limiting terms unless specifically stated.

Spiral forming devices, systems, and methods of the present disclosure are described with respect to forming segments of towers for supporting wind turbines. However, this is by way of example and should not be understood to limit the presently disclosed devices, systems, and methods in any way. That is, in general, the spiral forming devices, systems, and methods of the present disclosure can be used to produce a variety of useful tubular structures such as, for example, towers, pilings, other structural pieces for civil engineers (e.g., columns), pipelines, spiral ducting, and the like.

Figure 1:
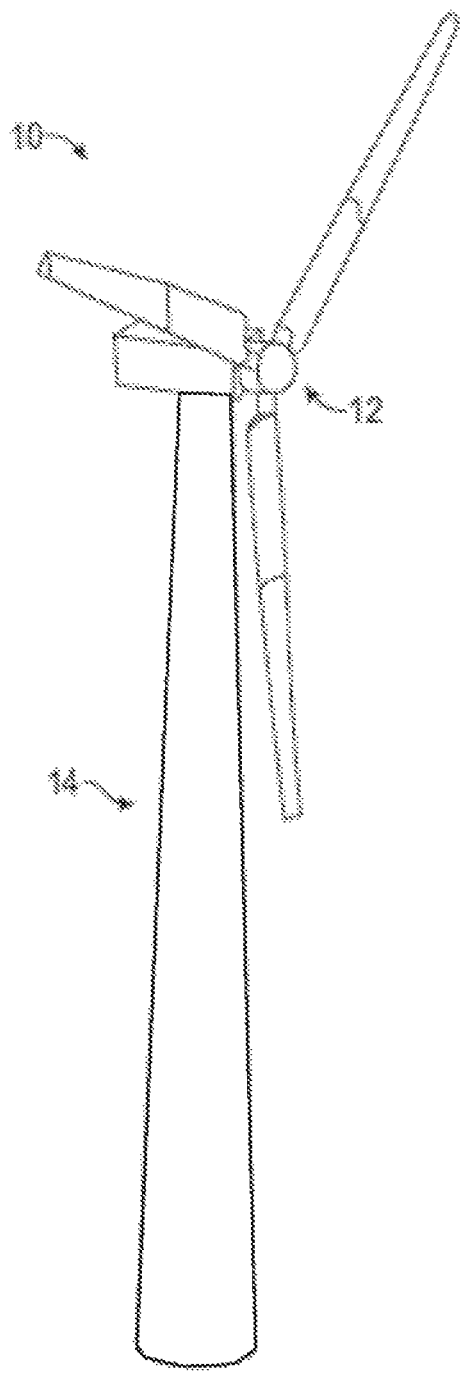
FIG. 1 is a schematic of a wind turbine assembly including a tapered tower.

Referring to FIG. 1, a wind turbine assembly 10 includes a wind turbine 12 supported by a tower 14. The tower 14 can have a diameter that decreases along the length of the tower 14 so that the top, where the wind turbine 12 is attached, has a smaller diameter than the base, where the tower 14 is fixedly secured to the ground or other rigid surface. The axially tapering diameter of the tower 14 can be useful, for example, for addressing competing considerations of efficient use of material while providing structural strength to support the loads exerted by or on the wind turbine 12 in the field. That is, in general, loads vary along the axial direction of the tower 14, with larger loads typically experienced toward the base of the tower 14 and lower loads typically experienced toward the top of the tower 14. Thus, for a given material thickness, the axial taper of the tower 14 can result in the use of less material as compared to a tower having only a single diameter selected to withstand a maximum stress load at the base. While the use of less material can be achieved by varying the diameter of the tower 14, it should be appreciated that less material can further, or instead, be achieved through the use of varying material thickness in a direction extending away from the base of the tower 14. More generally, changes in diameter, material type, material thickness, and combinations thereof can be varied along the tower 14 to achieve suitable design characteristics for withstanding loading while making efficient use of material.

The tower 14 can be fabricated from segments formed using a continuous spiral forming process in which, as described in greater detail below, a planar form of a stock material can be rolled into shape and joined along one or more spiral seams to form a tubular structure, such as a structure having a frusto-conical shape. When fabricated in this manner, variations in structural characteristics of the tower 14 along the axis of the tower 14 from the base to the top—whether achieved through changes in diameter, material type, material thickness, or combinations thereof—can require managing transitions in planar sheets forming the planar form of the stock material. As described herein, these transitions can be managed by controlling shape and relative orientation of the plurality of planar sheets forming the stock material and/or by controlling a position of a roll bender used to curve the planar form of the stock material into a curved configuration. Such control of the sheets through these transitions can advantageously facilitate rolling the sheets to a desired diameter with a reduced likelihood of dimples or other errors and, further or instead, can facilitate fit up between adjacent sheets in the curved configuration to increase the likelihood of meeting manufacturing tolerances in the final structure.

Figure 2:
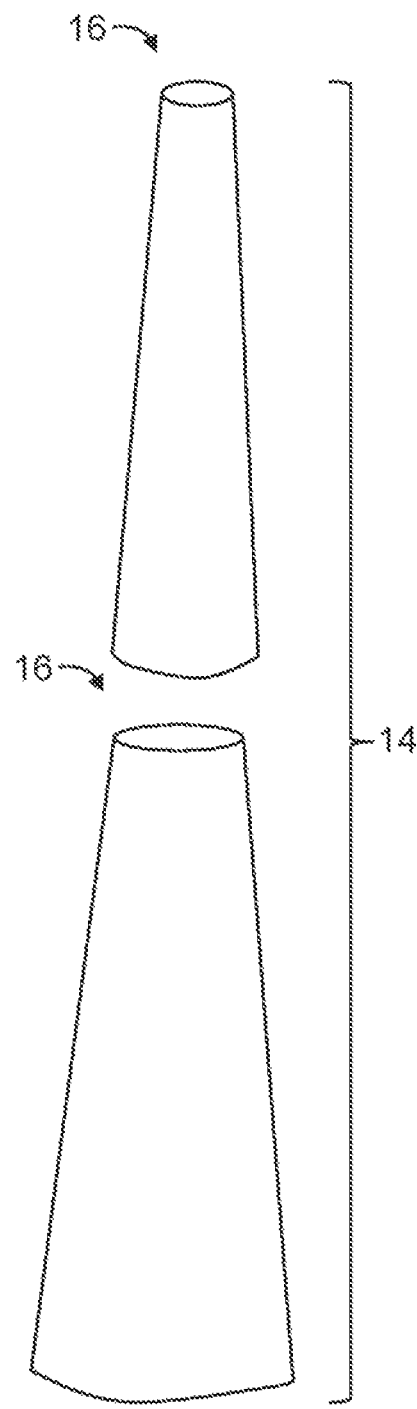
FIG. 2 is a perspective, exploded view of the tapered tower of FIG. 1 including conical segments.

Referring now to FIG. 2, the tower 14 may include a plurality of conical segments 16 joined (e.g., welded) to one another. For example, the conical segments 16 can be fabricated at a mill, according to the methods described herein, and then shipped to the field, where the frusto-conical segments 16 can be welded or otherwise mechanically coupled to one another to form the tower 14. While this provides a useful, modular structure, the tower 14 may instead be formed of a unitary conical segment without departing from the scope of the present disclosure. The tower 14 can, further or instead, include one or more cylindrical segments and, thus, more generally can be understood to include any manner and form of tubular segments.

Each conical segment 16 can have either an actual peak or a virtual peak. For example, one of the conical segments 16 can be shaped as a cone and, therefore, have an actual peak at its apex. Additionally, or alternatively, one or more of the conical segments 16 can be shaped as a truncated structure, such as a frusto-conical structure, and, therefore, can have a "virtual peak" at the point at which the taper would eventually decrease to zero if the structure were not truncated. Unless otherwise specified or made clear from the context, the devices, systems, and methods described herein should be understood to be applicable to conical segments 16 having either an actual peak or a virtual peak. More generally, unless otherwise specified or made clear from the context, devices, systems and methods described herein should be understood to be applicable to any of various different types of tubular structures.

Figure 3:
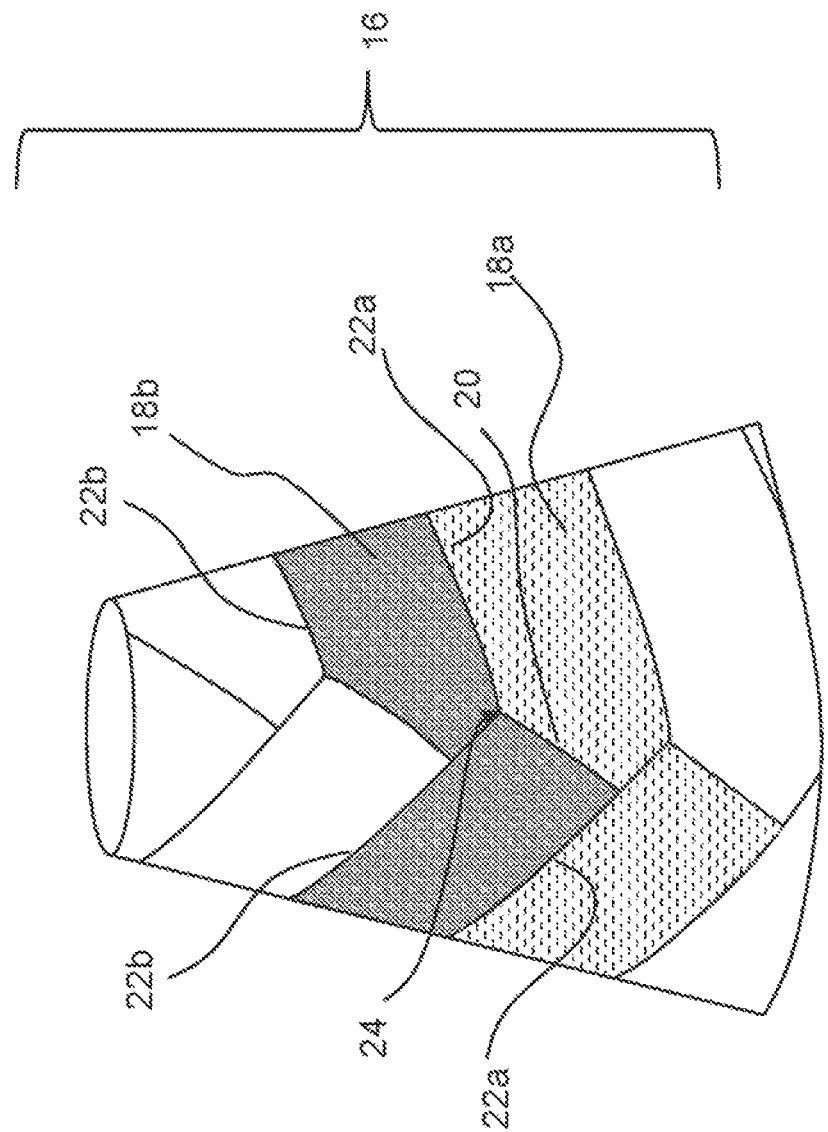
FIG. 3 is a perspective side view of one of the conical segments of the tapered tower of FIG. 1.

Referring now to FIG. 3, each conical segment 16 can include a first curved sheet 18a and a second curved sheet 18b. In general, it should be appreciated that each conical segment 16 can include a greater number of curved sheets, as necessary, to meet various different design requirements associated with the conical segment 16. Other curved sheets forming each conical segment 16 can be coupled to one another in a manner analogous to the coupling of the first curved sheet 18a and 18b and, thus, for the sake of efficient explanation, the coupling of the first curved sheet 18a to the second curved sheet 18b is described herein as an illustrative example that shall be understood to be applicable to the coupling of the other curved sheets in each conical segment 16, unless otherwise specified or made clear from the context.

The first curved sheet 18a and the second curved sheet 18b can be joined end-to-end along a lateral seam 20, as described in greater detail below, prior to rolling the first curved sheet 18a and the second curved sheet 18b. The first curved sheet 18a and the second curved sheet 18b can be, for example, metal such that the first curved sheet 18a and the second curved sheet 18b can be curved and joined to one another using any one or more of the various different devices, systems, and methods described herein. In instances in which the first curved sheet 18a and the second curved sheet 18b are metal, the lateral seam 20 can be a weld formed using any one or more of the various different devices, systems, and methods described herein.

The lateral seam 20 can orient the curved first sheet 18a and the curved second sheet 18b relative to one another to facilitate alignment, or fit up, of longitudinal edges of the first curved sheet 18a, the second curved sheet 18b, and one or more other adjacent curved sheets to form a first spiral seam 22a properly aligned with a second spiral seam 22b between the second curved sheet 18b and another curved sheet. That is, longitudinal edges of the first curved sheet 18a and the second curved sheet 18b can be orientated relative to one another such that the lateral seam 20, the first spiral seam 22a, and the second spiral seam 22b come together in a specific orientation at the intersection 24. More specifically, the lateral seam 20, the first spiral seam 22a, and the second spiral seam 22b can come together at the intersection 24 in a "T"-shape. As used herein, a "T" shape shall be understood to include any manner and form of intersection of three seams. For example, the lateral seam 20, the first spiral seam 22a, and the second spiral seam 22b can be oblique relative to one another at the intersection 24. As compared to an "X"-shaped intersection formed through the intersection of four seams, the formation of the intersection 24 in the "T"-shape can reduce the likelihood of weld defects at the intersection, inaccuracy in alignment of seams, and/or inaccuracy of the rolled diameter and, thus, can facilitate manufacturing tubular structures having improved dimensional tolerance.

The first spiral joint 22a and the second spiral joint 22b may extend in a spiral which, as used herein, includes a joint that wraps around the circumference of a structure while also extending along the length of the structure. For example, the term spiral can be any curvilinear shape extending substantially around the circumference of a structure while also extending along the length of the structure. As used herein, a curvilinear shape should be understood to refer to a mathematical function that is differentiable everywhere along the shape. Accordingly, the use of the term spiral, as used herein, should be understood to include one or more curves on a conical or cylindrical surface and should further be understood to exclude sharp corners, such as the type of corners formed by the intersection of straight segments.

The first spiral joint 22a and the second spiral joint 22b may each extend circumferentially about a longitudinal axis defined by the conical segment 16. A radial distance from the first spiral joint 22a to the longitudinal axis of the conical segment 16 is monotonically varying in a direction along the longitudinal axis. Similarly, a radial distance from the second spiral joint 22b to the longitudinal axis is monotonically varying in a direction along the longitudinal axis. Collectively, the curved first sheet 18a, the curved second sheet 18b, and the other curved sheets of the conical segment 16 form a structure that narrows from one end to another. This can be, for example, a linear taper that forms a substantially conical shape of the conical segment 16.

Figure 4:
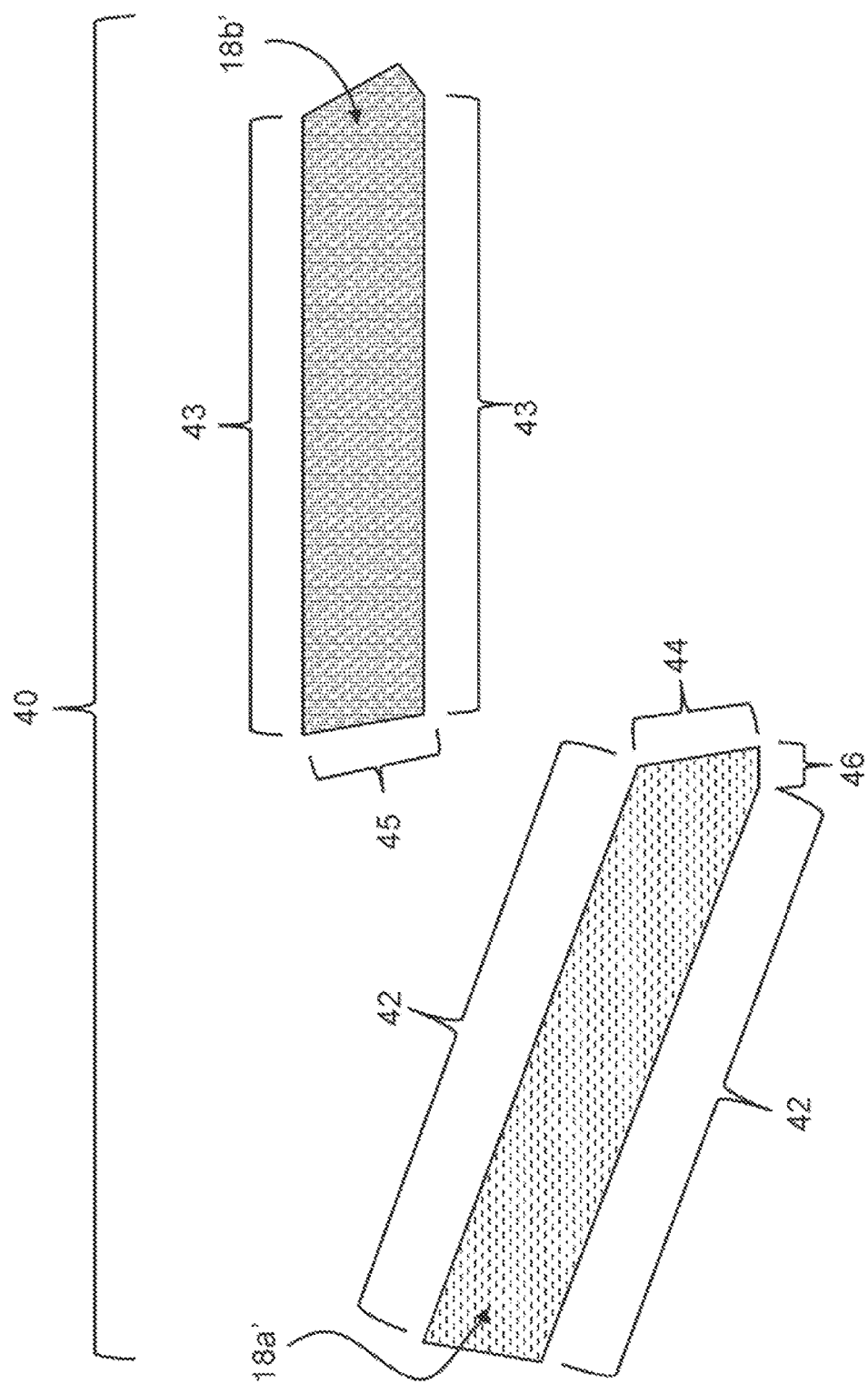
FIG. 4 is a top view of a collection of a plurality of planar sheets for forming a portion of the conical segment of FIG. 3.
Figure 5:
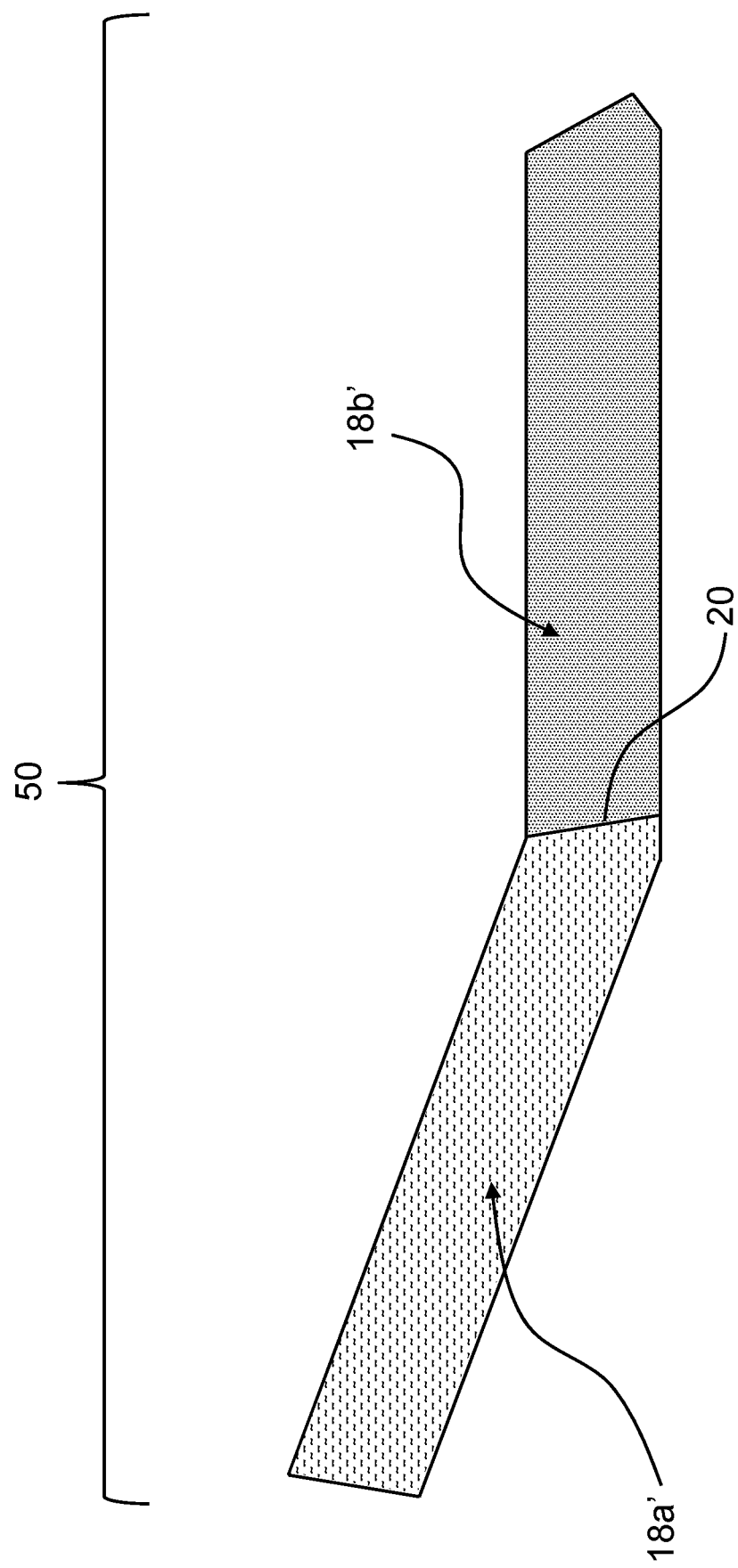
FIG. 5 is a top view of planar form of a stock material formed from the collection of the plurality of planar sheets of FIG. 4.

Referring now to FIGS. 4 and 5, a collection 40 of a plurality of planar sheets can be collectively dimensioned to form, in a spiral configuration, a tubular structure. For example, the collection 40 of the plurality of planar sheets can be collectively dimensioned to form, in a curved configuration, a frusto-conical structure without in-plane deformation of the planar sheets such as the conical segment 16 (FIG. 3). The plurality of planar sheets can include a first planar sheet 18a' and a second planar sheet 18b'. It should be appreciated that sheets represented by the primed numbers in FIGS. 4A and 4B represent planar forms of respective curved sheets in FIG. 3. Accordingly, the first planar sheet 18a' should be understood to be a planar, or flat, form of the curved sheet 18a before rolling, and the second planar sheet 18b' should be understood to be a planar, or flat, form of the curved sheet 18b before rolling. As described in greater detail below, the first planar sheet 18a' and the second planar sheet 18b' can be positioned in an abutting relationship to one another and, so positioned, can be coupled together (e.g., welded) to form a stock material 50 in planar form that can be fed into any one or more of the curving devices described herein to form a tubular structure, such as the conical segment 16 (FIG. 3).

The first planar sheet 18a' can have a pair of first longitudinal edges 42, a mating edge 44, and an alignment edge 46. In general, the mating edge 44 and the alignment edge 46 together define a nonlinear path extending between the first longitudinal edges 42 (e.g., extending from one of the first longitudinal edges 42 to another one of the first longitudinal edges 42). That is, neither the mating edge 44 nor the alignment edge 46 is collinear with either of the first longitudinal edges 42. The mating edge 44 can, for example, include a linear segment having a lateral dimension, and the alignment edge 46 can include a linear segment having a lateral dimension intersecting the at least one linear segment of the mating edge 44 such that the overall shape of a path defined by the mating edge 44 and the alignment edge 46 is nonlinear from one of the first longitudinal edges 42 to another one of the first longitudinal edges 42. Further, or instead, the mating edge 44 and the alignment edge 46 together can span an entire width of the first planar sheet 18a', from one of the first longitudinal edges 42 to the other one of the first longitudinal edges 42.

The second planar sheet 18b' can have a pair of second longitudinal edges 43 and a lateral edge 45. The lateral edge 45 can extend between the second longitudinal edges 43. For example, the lateral edge 45 can extend an entire width of the second planar sheet 18b', from one of the second longitudinal edges 43 to the other one of the second longitudinal edges 43. In certain implementations, the lateral edge 45 can define a linear path between the second longitudinal edges 43. More generally, forming the mating edge 44 of the first planar sheet 18a' and the lateral edge 45 of the second planar sheet 18b' as simple geometries can facilitate aligning the first planar sheet 18a' and the second planar sheet 18b' to establish an abutting relationship in which the mating edge 44 of the first planar sheet 18a' complements the lateral edge 45 of the second planar sheet 18b'.

The first planar sheet 18a' and the second planar sheet 18b' can be dimensioned to be positionable relative to one another in an abutting relationship in which the mating edge 44 of the first planar sheet 18a' complements the lateral edge 45 between the second longitudinal edges 43 of the second planar sheet 18b' and the alignment edge 46 of the first planar sheet 18a' is collinear with one of the second longitudinal edges 43 of the second planar sheet 18b'. The stock material 50 formed through coupling the first planar sheet 18a' and the second planar sheet 18b' together in this orientation has multiple features that cooperate to align curved sheets (e.g., the first curved sheet 18a and the second curved sheet 18b in the conical segment 16 in FIG. 3) in the formation of a tubular structure. For example, as compared to joining sheets by aligning four seams at an intersection (e.g., in an "X"-shape), the first curved sheet 18a and the second curved sheet 18b (FIG. 3) formed from the first planar sheet 18a' and the second planar sheet 18b', respectively, can be joined to one another by aligning three seams at an intersection (e.g., in a "T"-shape). Each seam potentially adds inaccuracies in alignment and geometry. Therefore, because a "T"-shaped intersection has one less seam than an "X"-shaped intersection, it should be understood that curved sheets can be more accurately aligned at a "T"-shaped intersection than at an "X"-shaped intersection.

As used herein, a complementing relationship between two edges should be understood to include a relationship in which the edges match one another along an entirety of each edge. For example, a complementing relationship can exist between two straight edges, between two curvilinear edges, between two edges with multiple segments, and combinations thereof, provided that the two edges can be placed against one another along an entirety of each edge. Thus, as a specific example, in the abutting relationship between the first planar sheet 18a' and the second planar sheet 18b', the first planar sheet 18a' and the second planar sheet 18b' can form a continuous surface (e.g., to define a seam along which the first planar sheet 18a' and the second planar sheet 18b' can be joined to one another through conventional welding techniques).

In general, it should be understood that the orientation of the first longitudinal edges 42 of the first planar sheet 18a' to the second longitudinal edges 43 of the second planar sheet 18b' is such that, in the three-dimensional form of a tubular structure (e.g., the conical segment 16 in FIG. 3), one of the first longitudinal edges 42 can be adjacent to one of the second longitudinal edges 43 to form at least a portion of a spiral seam along the tubular structure. In the abutting relationship between the first planar sheet 18a' and the second planar sheet 18b', one of the first longitudinal edges 42 of the first planar sheet 18a' can be oblique relative to one of the second longitudinal edges 43 of the second planar sheet 18b'. That is, one of the first longitudinal edges 42 of the first planar sheet 18a' can be neither parallel nor perpendicular to one of the second longitudinal edges 43. The degree of the oblique orientation can be a function of the dimensions of the tubular structure and, optionally, the portion of the tubular structure to be formed by the first planar sheet 18a' and the second planar sheet 18b'.

In certain implementations, in the abutting relationship between the first planar sheet 18a' and the second planar sheet 18b', one of the first longitudinal edges 42 of the first planar sheet 18a' can contact one of the second longitudinal edges 43 of the second planar sheet 18b' to define a substantially continuous edge (e.g., an edge that is uninterrupted except for a seam between the first planar sheet 18a' and the second planar sheet 18b') extending from the first planar sheet 18a' to the second planar sheet 18b'. For example, one of the first longitudinal edges 42 of the first planar sheet 18a' can be in contact with one of the second longitudinal edges 43 of the second planar sheet 18b' along only a line of contact (e.g., along a line of contact defined by a thickness dimension of one or both of the first planar sheet 18a' and the second planar sheet 18b'). Further or instead, the other one of the first longitudinal edges 42 and the other one of the second longitudinal edges 43 can be spaced apart from one another by the alignment edge 46.

In general, the first planar sheet 18a' and the second planar sheet 18b' can be, for example, formed of metal, such as steel or any other material suitable for spiral forming. The first planar sheet 18a' and the second planar sheet 18b' can have any of various different thicknesses suitable for achieving desired structural performance of the conical segment (FIG. 3) into which the first planar sheet 18a' and the second planar sheet 18b' will be incorporated. For example, the first planar sheet 18a' and the second planar sheet 18b' can have a thickness of greater than about 10 mm and less than about 50 mm for utility scale wind tower applications. Additionally, or alternatively, the first planar sheet 18a' can have, for example, a first thickness, and the second planar sheet 18b' can have a second thickness equal to the first thickness. The use of the same material having the same thickness can facilitate, for example, controlling curvature transitions between the first planar sheet 18a' and the second planar sheet 18b'. In certain implementations, the first planar sheet 18a' and the second planar sheet 18b' can have different thicknesses and, as described in greater detail below, such transitions in thickness can be managed to achieve appropriate curvature. As used herein, the respective thicknesses of the first planar sheet 18a' and the second planar sheet 18b' shall be understood to refer to a dimension of the respective sheet in a direction perpendicular to a plane defined by each respective sheet.

In general, the first planar sheet 18a' and the second planar sheet 18b' can each have an elongate shape. That is, each of the first planar sheet 18a' and the second planar sheet 18b' can each have a shape that is substantially longer than a maximum width defined by the respective first longitudinal edges 42 and the second longitudinal edges 43. The elongate shape can facilitate, for example, curving a respective sheet without requiring excessive forces to be provided by the curving device. Further, or instead, the elongate shape can be useful for forming the first planar sheet 18a' and the second planar sheet 18b' from material (e.g., steel) that is ubiquitously available in standard sizes. That is, the length of the material in the longitudinal direction can be selected based on a diameter of the structure being formed while the width of the material can be a standard, commercially available size.

In certain implementations, such as in the formation of a conical structure, the first planar sheet 18a' and the second planar sheet 18b' can have different lengths. For example, as a diameter of a conical structure decreases in an axial direction defined by the conical structure, shorter lengths of planar sheets can be used to form the conical structure. That is, as the diameter of a conical structure decreases in the axial direction defined by the conical structure, less material can be used in the conical structure. The use of less material can have significant advantages with respect to cost savings and, further or instead, can facilitate achieving an allowed stress response along the conical structure.

The pair of first longitudinal edges 42 of the first planar sheet 18a' can be parallel to one another to define a first width along the first planar sheet 18a'. Similarly, the pair of second longitudinal edges 43 can be parallel to one another to define a second width along the second planar sheet 18b'. In certain implementations, the first width defined by the first longitudinal edges 42 can be equal to the second width defined by the second longitudinal edges 43. Such equal width dimensions can, for example, control dimensions of the planar form of the stock material 50. Additionally, or alternatively, such equal width dimensions can facilitate accurately controlling a spiral seam (e.g., the first spiral seam 22a) formed along a curved configuration of the stock material 50. In certain instances, equal widths of the first planar sheet 18a' and the second planar sheet 18b' can have certain commercial advantages, such as facilitating forming structures from commercially available, standard-sized sheets. That is, as compared to cutting sheets to custom widths and producing scrap in the process, the first planar sheet 18a' and the second planar sheet 18b' can be formed of the same width from standard material purchased in standard bulk form (e.g., on a coil) and results in less scrap.

Referring now to FIGS. 3-5, the planar form of the stock material 50 can be curved using, for example, any of the devices, systems, and methods described herein such that the first planar sheet 18a' is formed into the first curved sheet 18a and, similarly, the second planar sheet 18b' is formed into the second curved sheet 18b. In general, unless otherwise specified or made clear from the context, it should be understood that the first curved sheet 18a has the same edges as the first planar sheet 18a', and the second curved sheet 18b has the same edges as the second planar sheet 18b'. By curving the edges of the first planar sheet 18a' and the second planar sheet 18b', the first curved sheet 18a and the second curved sheet 18b can be aligned with one another such that the alignment edge 46 of the first curved sheet forms at least a portion of the first spiral seam 22a with one of the second longitudinal edges 43 of the second curved sheet 18b. Further, or instead, the first curved sheet 18a and the second curved sheet 18b can be aligned with one another such that one of the first longitudinal edges 42 of the first curved sheet 18a and one of the second longitudinal edges 43 of the second curved sheet 18b are joined along the first spiral seam 22a.

Figure 6:
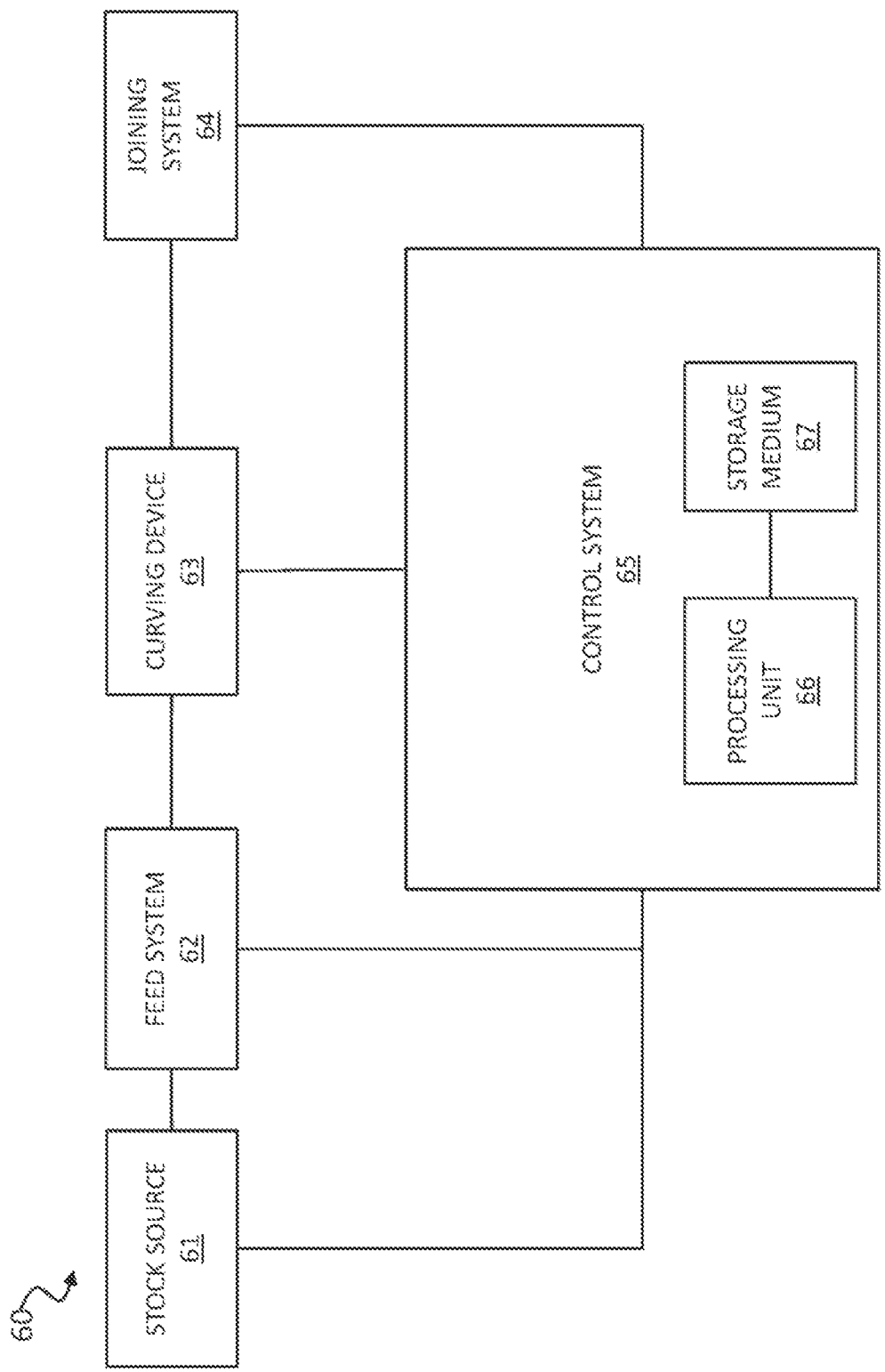
FIG. 6 is a block diagram of a fabrication system.
Figure 7:
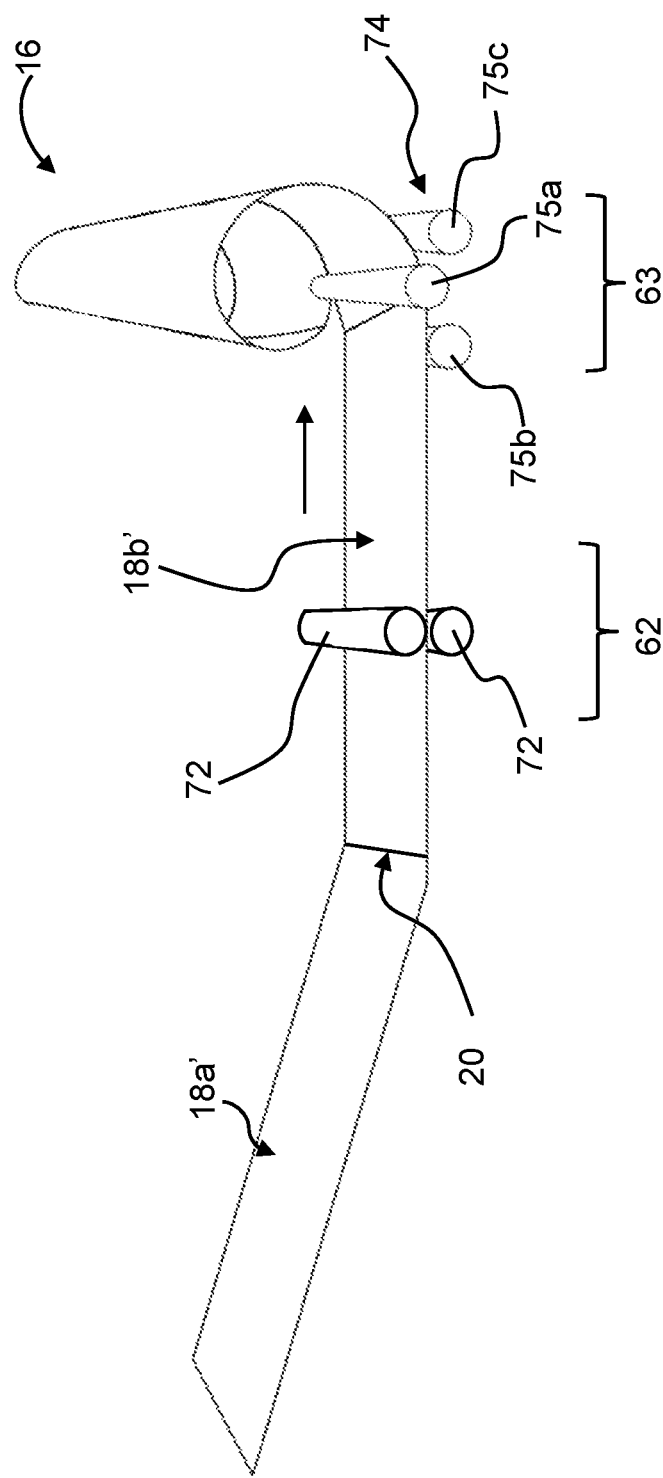
FIG. 7 is a schematic representation of a spiral forming process carried out by the fabrication system of FIG. 6.

Referring now to FIGS. 6 and 7, a fabrication system 60 can include a stock source 61, a feed system 62, a curving device 63, a joining system 64, and a control system 65. As described in greater detail below, the fabrication system 60 can be operable to fabricate the conical segments 16 (FIG. 3) according to any one or more of the spiral forming methods disclosed herein. The control system 65 may control at least one of the stock source 61, the feed system 62, the curving device 63, and the joining system 64. In some implementations, the control system 65 can control more or fewer components of the fabrication system 60, and any combinations thereof. For example, the control system 65 can additionally control a runout system to move formed portions of the conical segment 16 in a direction away from the curving device 63 and/or the joining system 64. For clarity of explanation, the operation of the fabrication system 60 and the methods of spiral forming disclosed herein are described with respect to the conical segments 16 described above. It should be appreciated, however, that other types of tubular structures (e.g., substantially cylindrical structures) may also or instead be fabricated using these techniques.

The control system 65 can include a processing unit 66 and a storage medium 67 in communication with the processing unit 66. The processing unit 66 can include one or more processors, and the storage medium 67 can be a non-transitory, computer-readable storage medium. The storage medium 67 can store computer-executable instructions that, when executed by the processing unit 66, cause the fabrication system 60 to perform one or more of the spiral forming methods described herein. Optionally, the control system 65 can include an input device (e.g., a keyboard, a mouse, and/or a graphical user interface) in communication with the processing unit 66 and the storage medium 67 such that the processing unit 66 is additionally, or alternatively, responsive to input received through the input device as the processing unit 66 executes one or more of the spiral forming methods described herein.

More generally, the control system 65 may include any processing circuitry configured to receive sensor signals and responsively control operation of the fabrication system 60. This can, for example, include dedicated circuitry configured to execute processing logic as desired or required, or this can include a microcontroller, a proportional-integral-derivative controller, or any other programmable process controller. This can also or instead include a general purpose microprocessor, memory, and related processing circuitry configured by computer executable code to perform the various control steps and operations described herein.

The stock source 61 can include a plurality of planar sheets of source material, which can be stored in a magazine or other suitable dispenser to facilitate selection and loading of the plurality of sheets during manufacturing. For the sake of efficient and clear explanation, the plurality of planar sheets is described as including the first planar sheet 18a' and the second planar sheet 18b' and the fabrication system 60 is described with respect to the first planar sheet 18a' and the second planar sheet 18b'. It should be appreciated, however, that the plurality of planar sheets can include any number of additional sheets as required for the formation of the conical segment 16.

Between the stock source 61 and the feed system 62, the first planar sheet 18a' and the second planar sheet 18b' can be joined (e.g., welded) to one another at the lateral seam 20 to form the planar form of the stock material 50. In general, the lateral seam 20 can be oblique to a feed direction "F" at which the planar form of the stock material 50 enters the curving device 63.

The feed system 62 may be operable to transport the planar form of the stock material 50 from the stock source 61 to and/or through the curving device 63. The feed system 62 can include, for example, one or more pairs of drive rolls 72. In use, the drive rolls 72 can pinch the planar form of the stock material 50 such that rotation of the drive rolls 72 can move the planar form of the stock material 50 along the feed direction "F." In certain implementations, the feed direction "F" can be substantially constant (e.g., with the one or more pairs of drive rolls 72 in a substantially stationary position as the rotation of the one or more pairs of drive rolls 72 moves the planar form of the stock material 50 to and/or through the curving device 63). Additionally, or alternatively, the feed direction "F" can change such that the planar form of the stock material 50 undergoes rotational motion and/or substantially rotational motion as the planar form for the stock material 50 is moved to and through the curving device 63. Such changes in the feed direction "F" can be useful for aligning edges of the stock material 50 to form any one or more of the structures described herein. Examples of such changes in the feed direction "F" to produce rotational and/or substantially rotational motion as part of the fabrication process of tubular structures are described in U.S. Pat. No. 9,302,303, issued Apr. 5, 2016, and U.S. Pat. App. Pub. No. 2015/0273550, filed Mar. 28, 2014, the entire contents of each of which are incorporated herein by reference. More generally, any equipment suitable for moving planar material according to any of various different techniques known in the art can be used to move the planar form of the stock material 50 from the stock source 61 to, and in some instances through, the curving device 63. Such equipment can include, for example, robotic arms, pistons, servo motors, screws, actuators, rollers, drivers, electromagnets, or combinations thereof.

The curving device 63 can impart a controllable degree of curvature to the planar form of the stock material 50 fed into it, preferably without imparting in-plane deformation to the stock material 50. The curving device 63 can, for example, include a roll bender 72 including roll banks 75a, 75b, 75c positioned relative to one another and to the planar form of the stock material 50 to impart curvature to the planar form of the stock material 50 fed through the roll banks 75a, 75b, 75c. In certain instances, the roll banks 75a, 75b, 75c can be arranged as a triple-roll and, further or instead, the roll banks 75a, 75b, 75c can be movable relative to one another to vary a bending moment applied to the stock material 50 moving through the roll bender 72. Each roll bank 75a, 75b, 75cc can include, for example, a plurality of individual rollers independently rotatable relative to one another and arranged along a respective axis defined by the respective roll bank 75a, 75b, 75c. Further, or instead, the individual rollers of the respective roll banks 75a, 75b, 75c can be positionable relative to a respective axis defined by the respective roll bank 75a, 75b, 75c (e.g., through an actuation signal received by the control system 65).

In general, the curving device 63 can impart a bending moment to the planar form of the stock material 50 to form the first planar sheet 18a' and the second planar sheet 18b' into the first curved sheet 18a and the second curved sheet 18b, respectively. The first planar sheet 18a' and the second planar sheet 18b' can be orientated relative to one another such that, through the application of bending moments to form the first curved sheet 18a and the second curved sheet 18b, the alignment edge 46 of the first curved sheet 18a and one of the second longitudinal edges 43 of the second curved sheet 18b can be adjacent to one of the first longitudinal edges 42 of the first curved sheet 18a. More specifically, these edges can be adjacent to one another along a spiral path.

The joining system 64 can mechanically couple the alignment edge 46 of the first curved sheet 18a and one of the second longitudinal edges 43 of the second curved sheet 18b to one of the first longitudinal edges 42 of the first curved sheet 18a to form at least a portion of the first spiral seam 22a. Similarly, the joining system 64 can mechanically couple edges forming the second spiral seam 22b. The joining system 64 can include, for example, a welder that welds the alignment edge 46 of the first curved sheet 18a and one of the second longitudinal edges 42 of the second curved sheet 18b to one of the first longitudinal edges 42 of the first curved sheet 18a using any suitable welding technique. A variety of techniques for welding are known in the art and may be adapted for joining one or more edges together as contemplated herein. This can, for example, include any welding technique that melts a base metal or other material along the first spiral seam 22a, the second spiral seam 22b, or both, optionally along with a filler material that is added to the joint to improve the strength of the bond. Conventional welding techniques suitable for structurally joining metal include, by way of example and not limitation: gas metal arc welding (GMAW), including metal inert gas (MIG) and/or metal active gas (MAG); submerged arc welding (SAW); laser welding; and gas tungsten arc welding (also known as tungsten, inert gas or "TIG" welding); and many others. These and any other techniques suitable for forming a structural bond between the first curved sheet 18a and the second curved sheet 18b can be adapted for use in the joining system 64 as contemplated herein. The mechanical coupling imparted by the joining system 64 can be, for example, continuous along the first spiral seam 22a, the second spiral seam 22b, or both to provide enhanced structural strength of the conical segment 16. The mechanical coupling may also or instead include intermittent coupling (e.g., at fixed distances) along the first spiral seam 22a, the second spiral seam 22b, or both to facilitate, for example, faster throughput for applications in which structural strength of the conical segment 16 is not a key design consideration.

Figure 8:
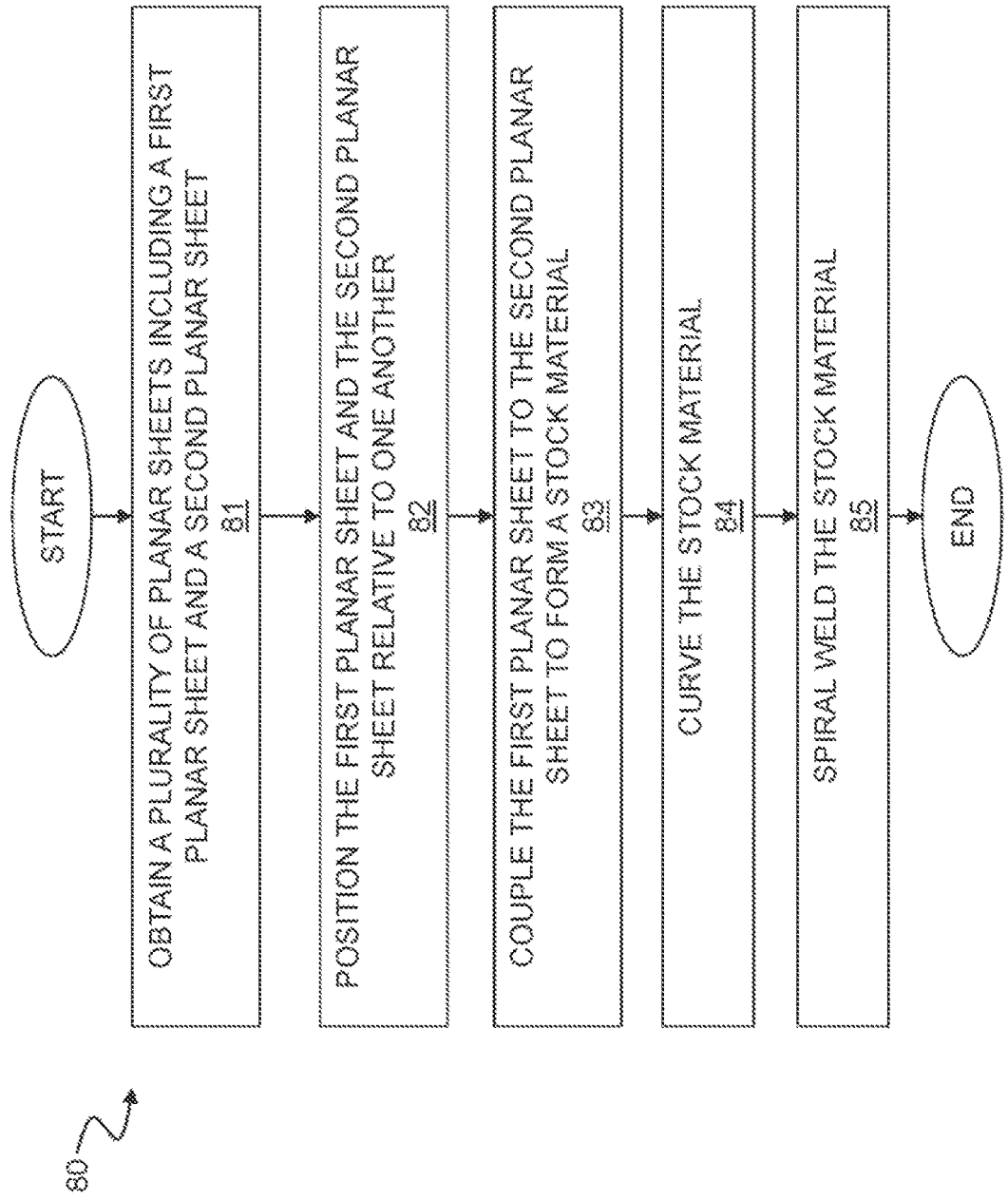
FIG. 8 is a flowchart of an exemplary method of forming a tubular structure.

Referring now to FIG. 8, a flowchart of an exemplary method 80 of spiral forming a structure is shown. It should be appreciated that the exemplary method 80 can be carried out, for example, by any one or more of the fabrication systems described herein to form any of the tubular structures described herein, including but not limited to a cylinder or a cone (e.g., a frusto-conical structure or segment). For example, one or more steps in the exemplary method 80 can be carried out by a processing unit of a control system (e.g., the processing unit 66 of the control system 65 in FIG. 6). Additionally, or alternatively, one or more steps in the exemplary method 80 can be carried out by an operator providing inputs (e.g., through a keyboard, a mouse, and/or a graphical user interface) to a control system such as the control system 65 of FIG. 6.

As shown in step 81, the exemplary method 80 can include obtaining a plurality of planar sheets. For example, the plurality of planar sheets can be obtained from a stock source, such as the stock source 61 in FIG. 6. In general, the plurality of planar sheets can include any number and form of planar sheets collectively dimensioned for forming a tubular structure, such as a cylinder or a cone (e.g., the frusto-conical segment 16 in FIG. 3). More specifically, the plurality of planar sheets can include a first planar sheet and a second planar sheet such as, for example, the first planar sheet 18a' and the second planar sheet 18b' in FIG. 4. Thus, the first planar sheet can have a pair of first longitudinal edges, a mating edge, and an alignment edge as described above with respect to the first planar sheet 18a. Similarly, the second planar sheet can have a lateral edge and a pair of second longitudinal edges, such as described above with respect to the second planar sheet 18b'. Further, or instead, the first planar sheet and the second planar sheet can each have an elongate shape and, in instances in which these sheets are to be formed into a conical segment such as the conical segment 16 in FIG. 3, the first planar sheet and the second planar sheet can have different lengths (e.g., the first planar sheet can be longer than the second planar sheet).

As shown in step 82, the exemplary method 80 can include positioning the first planar sheet and the second planar sheet relative to one another in an abutting relationship. For example, in the abutting relationship, the mating edge of the first planar sheet can complement the lateral edge of the second planar sheet between the second longitudinal edges. Further, with the mating edge of the first planar sheet complementing the lateral edge of the second planar sheet, the alignment edge of the first planar sheet can be collinear with one of the second longitudinal edges of the second planar sheet.

As shown in step 83, the exemplary method 80 can include coupling (e.g., welding) the mating edge of the first planar sheet to the lateral edge of the second planar sheet along a lateral seam to form a stock material in planar form. It should be appreciated that the shape of the lateral seam can follow the shape of the abutting relationship between the first planar sheet and the second planar sheet. Thus, more generally, the lateral seam can include at least one linear segment, at least one non-linear segment, or both.

As shown in step 84, the exemplary method 80 can include curving the stock material into a curved configuration. For example, as a planar form of the stock material is moved through a curving device, such as the curving device 63 in FIGS. 6 and 7, bending moments can be applied to the stock material to form a curved configuration of the stock material (e.g., without imparting in-plane deformation to the stock material).

As shown in step 85, the exemplary method can include spiral welding the stock material to form a tubular structure, such as a frusto-conical structure. As an example, spiral welding can include coupling one of the longitudinal edges of the first curved sheet (e.g., the first planar sheet in a curved configuration imparted through a curving step, such as step 84) to one of the second longitudinal edges of the second curved sheet (e.g., the second planar sheet in a curved configuration imparted through a curving step, such as step 84).

While certain embodiments have been described, other embodiments are additionally or alternatively possible.

For example, while joining a first edge region to a second edge region has been described as including welding, other methods of joining edge regions to one another are additionally or alternatively possible. Examples of such other methods include adhesive bonding, spot welding, seam locking, and/or mechanical fastening with bolts, rivets and the like, as well as combinations of the foregoing.

Figure 9:
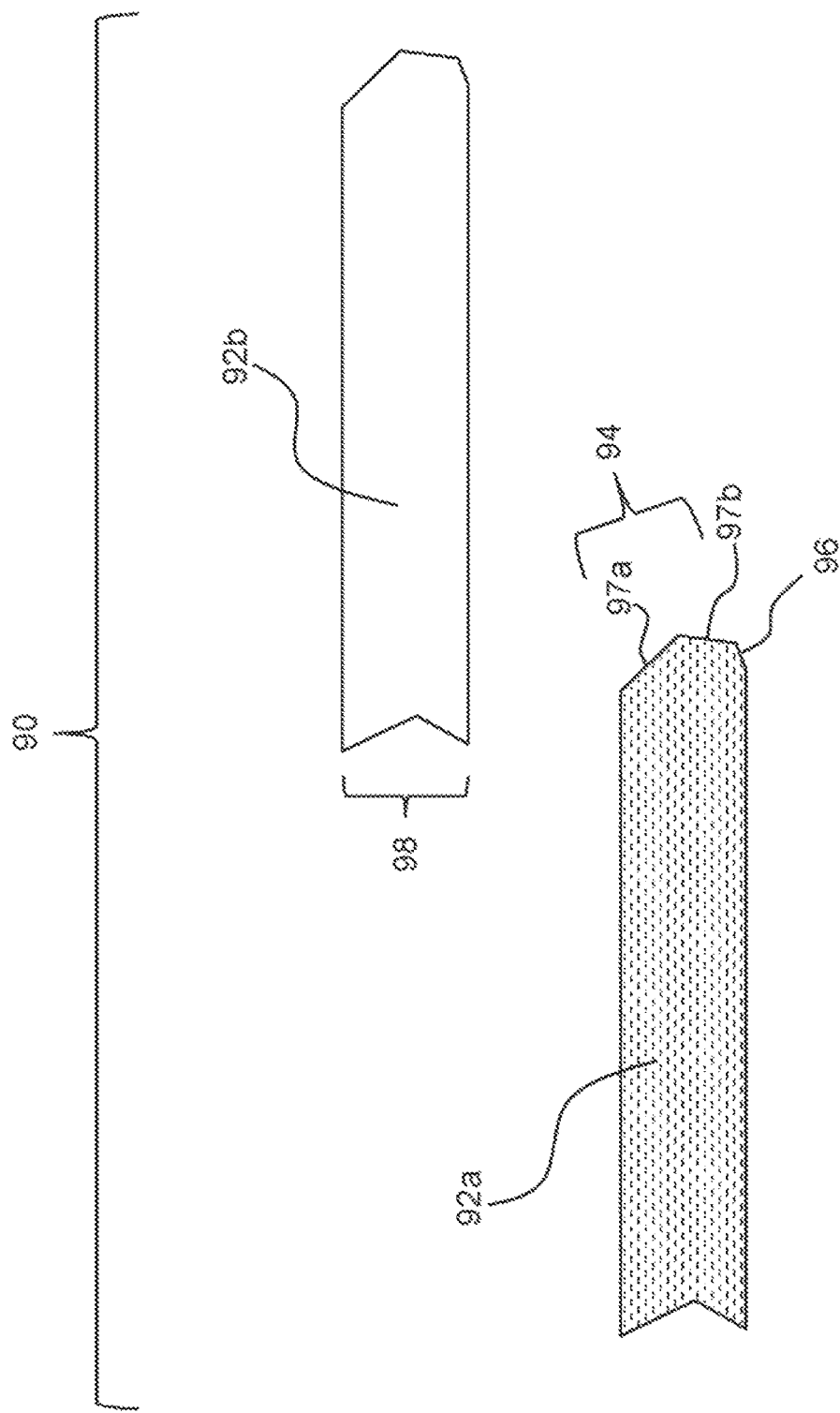
FIG. 9 is a top view of a collection of a plurality of planar sheets.

As another example, while planar sheets have been described as having certain edge shapes, other edge shapes are additionally or alternatively possible. For example, as referring now to FIG. 9, a collection 90 of planar sheets can include a first planar sheet 92a and a second planar sheet 92b. In general, unless otherwise specified or made clear from the context, the collection 90 of planar sheets can be formed into a tubular structure using any one or more of the devices, systems, and methods described herein.

The first planar sheet 92a can include a mating edge 94 and an alignment edge 96. The mating edge 94 can include, for example, a plurality of linear segments 97a, 97b. The plurality of linear segments 97a, 97b can be angled relative to one another. The second planar sheet 92b can include a lateral edge 98 shaped to complement the shape defined by the linear segments 97a, 97b of the first planar sheet 92a. Thus, for example, the lateral edge 98 can define a nonlinear path such that the lateral edge 98 complements the linear segments 97a, 97b of the first planar sheet 92a. The non-linear path of the lateral edge 98 can be, for example, define a chevron or another shape defined by linear or straight segments angled relative to one another.

As another example, while the planar sheets have been described as having edges with one or more linear segments to facilitate alignment in a given orientation suitable for formation of tubular structures, other edge shapes are additionally or alternatively possible. For example, one or more edges of the planar sheets can include a curvilinear shape. As a specific example, a transition between the linear segments 97a, 97b of the first planar sheet 92a can be rounded. Additionally, or alternatively, the lateral edge 98 of the second planar sheet 92b can include a corresponding shape including a rounded segment matching the rounded transition between the linear segments 97a, 97b. More generally, curvilinear shapes of one or more portions of edges described herein should be understood to be substitutable for linear shapes, unless otherwise specified or made clear from the context, provided that other sheets include corresponding edges to match such curvilinear shapes.

As still another example, while the planar sheets have been described as having equal thickness, other arrangements of thickness are additionally or alternatively possible. For example, sequential sheets in a plurality of planar sheets can have different thicknesses, material properties, or both. Such differences in thickness and/or material properties are useful, for example, for achieving desired variations in structural performance along an axis of a tubular structure and, in certain instances, can facilitate achieving structural performance targets using less material and/or less expensive material.

While differences in one or more of thickness and material properties of sequential sheets can be useful for achieving efficient use of material, such differences can be associated with differences in respective curvature responses of the sheets to a given bending moment applied by a curving device. Thus, in general, the application of a single bending moment (e.g., through a fixed orientation of a curving device) through a transition between sheets having different thickness and/or material properties can lead to incorrect rolling during such a transition. For example, application of a bending moment suitable to curve a thicker sheet can result in over-rolling an adjacent thinner sheet such that the thinner sheet will have a higher curvature than desired. As another example, application of a bending moment suitable to curve a thinner sheet can result in under-rolling an adjacent thicker sheet such that the thicker sheet will have a lower curvature than desired. Each of these errors in rolling can result in misalignment in sections of a tubular structure being formed and rolled sections having curvature other than desired, which can create challenges for forming the tubular structure according to a given manufacturing tolerance.

As yet another example, while lateral portions of sequential sheets have been described in the context of being joined to one another to form a portion of a tubular structure, it should be appreciated that the opposite lateral portion of each sheet can have the same or a different shape, as required for mating with another sheet in the sequence. Thus, for example, a given sheet can include respective alignment edges and mating edges along each lateral portion of the sheet. Further or instead, a given sheet can include respective lateral edges along each lateral portion of the sheet.

Figure 10:
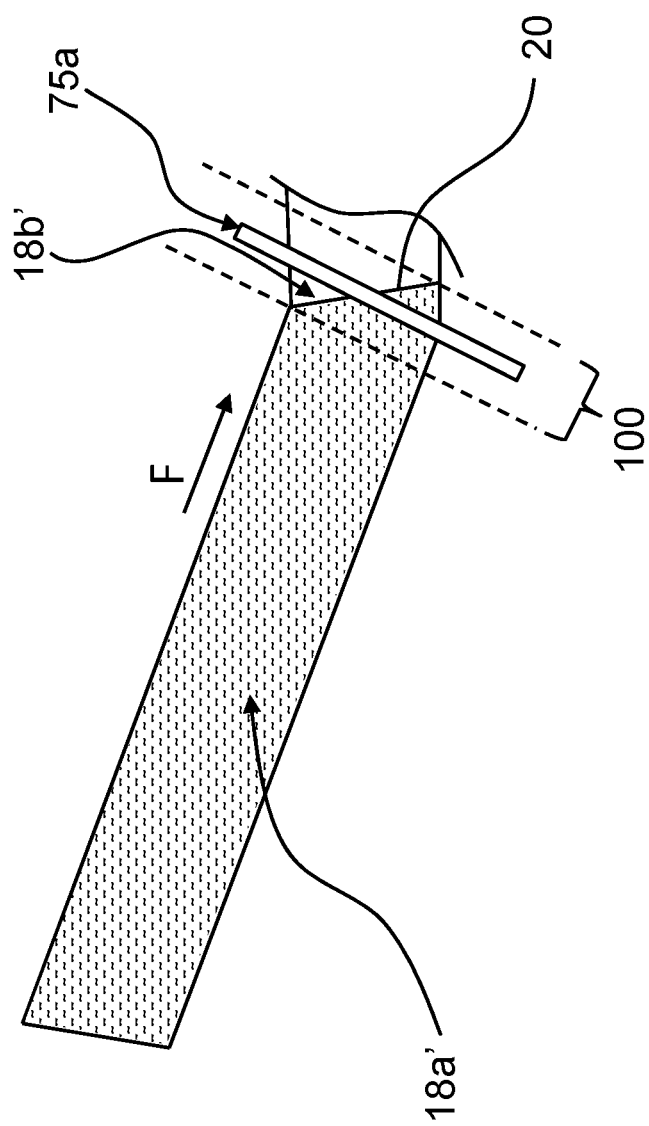
FIG. 10 is a schematic representation of a curving operation of the spiral forming process shown in FIG. 7.

Referring now to FIG. 7 and FIG. 10, the stock material 50 including the first planar sheet 18a' and the second planar sheet 18b' can be moved in the feed direction F. For the sake of clarity of illustration of the lateral seam 22a moving through the roll bender 74, only the roll bank 75a of the roll bender 74 is shown in FIG. 10. The lateral seam 20 corresponding to the abutting relationship of the first planar sheet 18a' and the second planar sheet 18b' can have a length in the feed direction "F," and this length of the abutting relationship of the first planar sheet 18a' and the second planar sheet 18b' in the feed direction "F" can define a transition length 100. Because the feed direction "F" is oblique relative to the lateral seam 20, it should be appreciated that the transition length 100 is finite. More specifically, the first planar sheet 18a' and the second planar sheet 18b' can be dimensioned relative to one another such that the lateral seam 20 and, thus, the transition length 100 can have a length sufficient to accommodate application of multiple different bending moments as the stock material 50 moves through the roll bender 74 in the feed direction "F." In certain implementations, the feed direction "F" can be changed as the stock material 50 is moved to and/or through the curving device 63 and, in particular, the stock material 50 can undergo rotational and/or substantially rotational motion as the stock material moves to and/or through the curving device 63.

In general, the bending moment applied by the roll bender 74 to the first planar sheet 18a' and the second planar sheet 18b' along the transition length 100 can be changed to account for differences in curvature response of the first planar sheet 18a' and the second planar sheet 18b'. For example, as the transition length 100 moves through the roll bender 74, the relative spacing of the roll banks 74a, 74b, and 74c can be adjusted to change a bending moment applied to the material. More specifically, a set position of the roll banks 74a, 74b, and 74c can be controlled, as described in greater detail below, to account for differences in curvature response (e.g., as a result of differences in thickness, material properties, or both) of the first planar sheet 18a' and the second planar sheet 18b'.

Figure 11:
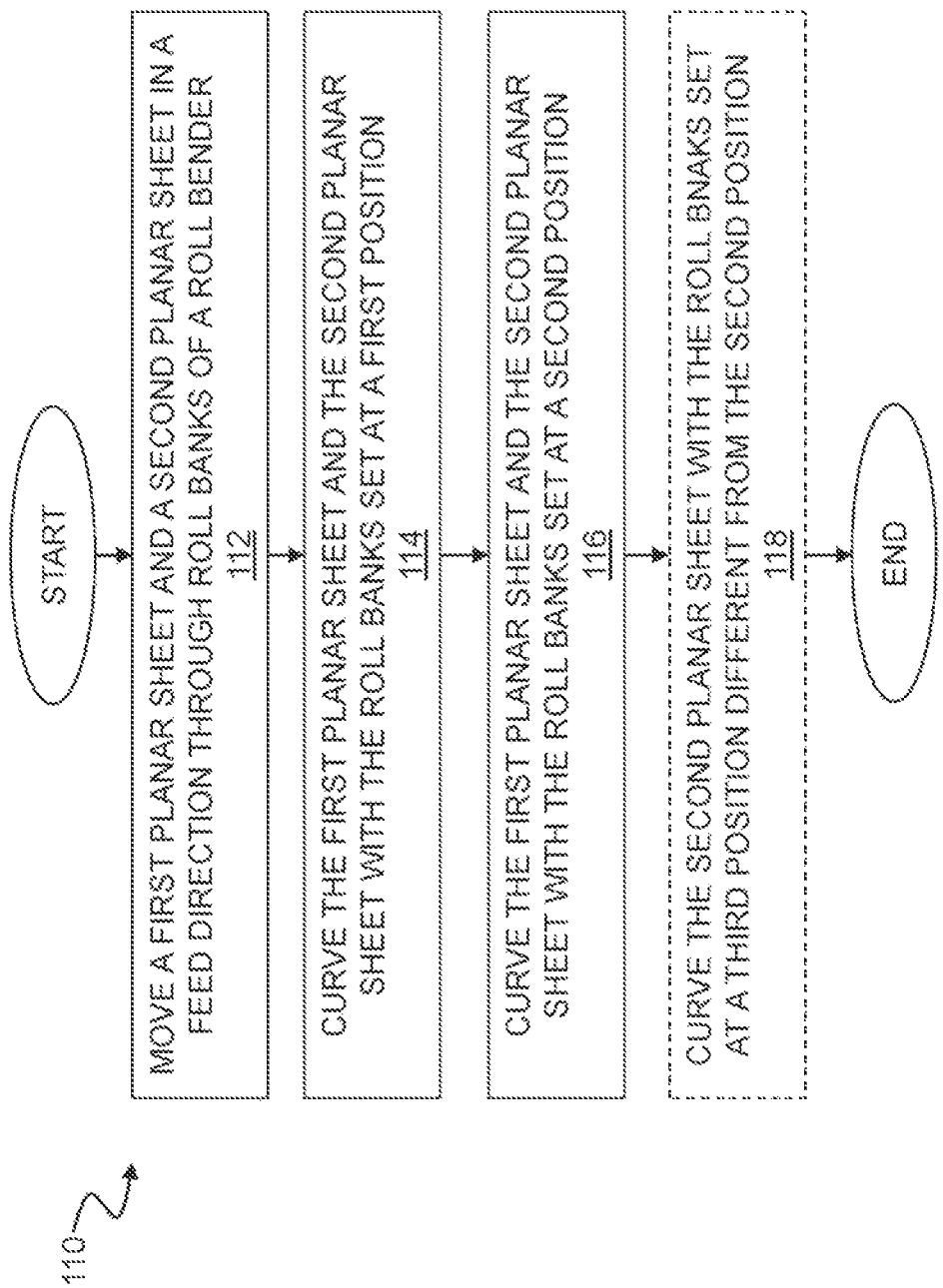
FIG. 11 is a flowchart of an exemplary method of applying curvature to a transition of planar sheets.

Referring now to FIG. 11, a flowchart of an exemplary method 110 of sheet transitioning in a spiral forming process is shown. It should be appreciated that the exemplary method 110 can be carried out, for example, by any one or more of the fabrication systems described herein to reduce the likelihood of over-rolling or under-rolling abutting planar sheets corresponding to a transition in thickness and/or material properties of a tubular structure, such as a cylinder or a cone (e.g., a frusto-conical structure or segment). For example, one or more steps in the exemplary method 110 can be carried out by a processing unit of a control system (e.g., the processing unit 66 of the control system 65 in FIG. 6). Additionally, or alternatively, one or more steps in the exemplary method 110 can be carried out by an operator providing inputs (e.g., through a keyboard, a mouse, and/or a graphical user interface) to a control system such as the control system 65 of FIG. 6).

As shown in step 112, the exemplary method 110 can include moving a first planar sheet and a second planar sheet in a feed direction through roll banks of a roll bender (e.g., the roll banks 75a, 75b, 75c of the roll bender 74 in FIG. 7). The feed direction can be, for example, oblique relative to an axis defined by one or more of the roll banks of the roll bender. The first planar sheet and the second planar sheet can be any one or more of the various different planar sheets described herein. Thus, for example, the first planar sheet and the second planar sheet can have the same maximum width in a direction perpendicular respective longitudinal edges of the first planar sheet and the second planar sheet. The uniform width of the first planar sheet and the second planar sheet can have certain advantages, such as facilitating uniform and accurate fabrication of the first planar sheet and the second planar sheet and reducing scrap material.

The first planar sheet and the second planar sheet can be coupled (e.g., welded) to one another in an abutting relationship, such as any of the various different abutting relationships described herein with respect to the lateral seam 20 (FIGS. 3, 5, and 10). The length of the abutting relationship between the first planar sheet and the second planar sheet along the feed direction defines a transition length. In instances in which the first planar sheet and the second planar sheet have different thicknesses and/or material properties, the transition length can represent a region in which the first planar sheet and the second planar sheet can have disparate responses to a given applied bending moment. Accordingly, as described in greater detail below, the bending moment applied to the first planar sheet and the second planar sheet can be adjusted along the transition length to reduce the likelihood of over-rolling and/or under-rolling the first planar sheet and the second planar sheet. It should be appreciated, therefore, that the size of the transition length is an important factor in the application of multiple different bending moments to the first planar sheet and the second planar sheet along the transition length.

In certain implementations, the abutting relationship between the first planar sheet and the second planar sheet can include abutment along one or more edges that are oblique to the feed direction and, further or instead oblique relative to an axis defined by one or more roll banks of the roll bender, as the first planar sheet and the second planar sheet move through the roll bender along the transition length. As a more general principle, the abutting relationship between the first planar sheet and the second planar sheet can be oriented relative to the one or more roll banks of the roll bender to achieve a suitable transition length and geometry.

As shown in step 114, the exemplary method 110 can include, within the transition length, curving the first planar sheet and the second planar sheet with the roll banks of the roll bender set at a first position. As used herein, "within the transition length" should be understood to refer to an action applied to the first planar sheet and the second planar sheet along the transition length. Thus, in the context of curving the first planar sheet and the second planar sheet, the term "within the transition length" should be understood to refer to the application of one or more bending moments to the first planar sheet and the second planar sheet as the transition length moves in a feed direction through the roll bender.

The first planar sheet can have a thickness different from a thickness of the second planar sheet. That is, the thickness of the first planar sheet can be greater than or less than the thickness of the second planar sheet. Additionally, or alternatively, the first planar sheet and the second planar sheet can be formed of different materials and, in particular, can be formed of materials having different yield strength. More generally, the first planar sheet and the second planar sheet can have different curvature responses to the roll banks of the roll bender set at the first position. That is, the bending moments exerted on the first planar sheet and the second planar sheet by the roll banks of the roll bender set at the first position can produce different amounts of curvature of the sheets along the portion of the transition length along which the roll banks of the roll bender are set at the first position.

As shown in step 116, the exemplary method 110 can include, within the transition length, curving the first planar sheet and the second planar sheet with the roll banks of the roll bender set at a second position. The second position of the roll banks of the roll bender can be different than the first position of the roll banks of the roll bender such that changing from the first set position to the second set position changes the bending moment applied to the first planar sheet and the second planar sheet along the transition length. Because of differences in thickness and/or material properties, the first planar sheet and the second planar sheet can have different curvature responses to the roll banks of the roll bender at the second position. Accordingly, the roll banks of the roll bender set at the second position can produce different amounts of curvature in the two sheets along the portion of the transition length along which the roll banks of the roll bender are set at the second position.

In general, it should be appreciated that the first set position of the roll banks of the roll bender and the second set position of the roll banks of the roll bender can be selected to apply a desired bending moment profile to the first planar sheet and the second planar sheet along the transition length. The desired bending moment profile can, for example, reduce the amount of under-rolling and/or over-rolling experienced by the first planar sheet and the second planar sheet along the transition length. As an example, in instances in which the first planar sheet is thicker than the second planar sheet, the first planar sheet and the second planar sheet can be curved by the roll banks of the roll bender set to the second position when more than half of the transition length has moved past a center roll of the roll bender (e.g., the roll bank 75a of the roll bender 74). An analogous example exists in instances in which the second planar sheet is thicker than the first planar sheet—that is, in such instances, the first planar sheet and the second planar sheet can be curved by the roll banks of the roll bender set to the second position when less than half of the transition length has moved past a center roll of the roll bender (e.g., the roll bank 75a of the roll bender 74). Thus, more generally, a transition from the first position to the second position can be based on the relative thickness of the first planar sheet to the second planar sheet, with, for example, the set position of a given sheet (e.g., the first planar sheet or the second planar sheet) being applied over more than half of the transition length in instances in which the given sheet is thicker than the other sheet (e.g., the other one of the first planar sheet and the second planar sheet) forming the transition length. Additionally, or alternatively, curving the first planar sheet and the second planar sheet with the roll banks of the roll bender set at the second position can include moving one or more of the roll banks of the roll bender relative to one another from the first set position to the second set position (e.g., as the transition length moves through the roll banks of the roll bender).

As shown in step 118, the exemplary method 110 can optionally include, along a length in the rolling direction within the transition length, curving the second planar sheet with the roll banks of the roll bender set at a third set position different from the second set position. For example, a respective curvature response of the second planar sheet to the roll banks of the roll bender set to the third position can be substantially equal to a respective curvature response of the first planar sheet to the roll banks of the roll bender set to the first position such that at least a portion of the first planar sheet and the second planar sheet are rolled at substantially the same diameter.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A structure comprising:
   a first curved sheet having a pair of first longitudinal edges parallel to one another; and
   a second curved sheet having a pair of second longitudinal edges, the first curved sheet and the second curved sheet forming at least a portion of a tapered conical segment, and the first curved sheet and the second curved sheet joined to one another along a first seam extending in a spiral and along a second seam oblique to the first seam, and the first curved sheet and the second curved sheet differing in thickness from one another along the second seam, wherein the pair of the second longitudinal edges of the second curved sheet are parallel to one another, and one of the second longitudinal edges of the second curved sheet abuts another one of the second longitudinal edges of the second curved sheet at an intersection of the first seam and the second seam.

2. The structure of claim 1, wherein the second seam spans a distance between the pair of the second longitudinal edges of the second curved sheet.

3. The structure of claim 1, wherein the intersection is a T-shape intersection.

4. The structure of claim 3, wherein the T-shape intersection has oblique angles.

5. The structure of claim 1, wherein the first curved sheet and the second curved sheet each have a respective maximum width in a direction perpendicular to each of the first longitudinal edges and to the second longitudinal edges.

6. The structure of claim 1, wherein the first curved sheet and the second curved sheet are formed of different materials.

7. The structure of claim 1, wherein the first curved sheet and the second curved sheet have different yield strengths.

\* \* \* \* \*